United States Patent
Haensgen et al.

(12) 
(10) Patent No.: US 6,459,557 B1
(45) Date of Patent: Oct. 1, 2002

(54) CONFIGURABLE SINGLE/MULTI-PHASE OVERLOAD RELAY

(75) Inventors: Steven T. Haensgen, Oak Creek; Ronald N. Jansen, New Berlin, both of WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/583,702

(22) Filed: May 31, 2000

(51) Int. Cl.[7] ................................................. H02H 3/00
(52) U.S. Cl. ........................ 361/93.2; 361/78; 700/292
(58) Field of Search ........................... 361/78, 85.87, 361/93.1, 93.2; 700/292, 286; 322/28; 307/17

(56) References Cited

U.S. PATENT DOCUMENTS

| | | | |
|---|---|---|---|
| 4,783,785 A | * 11/1988 | Hanta | 714/719 |
| 5,086,266 A | * 2/1992 | Shiga et al. | 322/28 |
| 5,524,083 A | * 6/1996 | Horne et al. | 364/492 |
| 6,167,329 A | * 12/2000 | Engel et al. | 700/293 |
| 6,204,751 B1 | * 3/2001 | Bolda et al. | 340/286.02 |

* cited by examiner

*Primary Examiner*—Kim Huynh
(74) *Attorney, Agent, or Firm*—Patrick S. Yoder; Alexander M. Gerasimow; William R. Walbrun

(57) ABSTRACT

A configurable overload relay selectively operable in a single-phase mode of operation and a multi-phase mode of operation is configured to sense current flow through power conductors. The relay is further configured to determine a parameter related to the current flow, such as average current, vector sum of phase currents, and current imbalance, based on selection of either the single-phase or multi-phase mode of operation. Regardless of the selected mode of operation, the relay can provide protection for multiple types of power conductor fault conditions, including ground faults, overloads, and phase loss. The relay further can be configured to provide a reporting signal indicative of the value of the determined current-related parameter and/or the occurrence of the fault condition.

28 Claims, 5 Drawing Sheets

CONFIGURABLE SINGLE/MULTI-PHASE OVERLOAD RELAY

BACKGROUND OF THE INVENTION

1. Field of the Invention

The present invention relates generally to relays for interrupting power on power conductors upon occurrence of a fault condition, such as a phase loss, ground fault, overload, or undercurrent condition. More particularly, the present invention relates to a relay that can be selectively configured to operate in either a single-phase mode or a multi-phase mode and which determines and reports diagnostic parameters associated with current flow through the power conductors. The relay is further configured to provide protection for fault conditions based on the determined diagnostic parameters, regardless of the selected mode of operation.

2. Description of the Related Art

Single-phase and multi-phase (e.g., three-phase) power systems typically include an overload relay for interrupting power in the power conductors when a fault condition occurs, such as a ground fault, phase loss, overcurrent, or undercurrent condition. A variety of types of overload relays are available, ranging from simple big-metal or eutectic overload relays to more complex, solid-state relays which may include some intelligence and/or reporting capabilities. Big-metal and eutectic overload relays include heater elements in each phase which open when an excessive current flowing through the heater elements causes the element to exceed a specific temperature. Solid-state relays, on the other hand, include electronic devices for monitoring phase current and for determining, based on the monitored current, whether a fault condition has occurred. Thus, solid-state relays typically can be configured to provide protection for ground fault, undercurrent and phase loss conditions, in addition to overcurrent conditions.

To provide such protection, however, the electronic devices included in a solid-state relay require power for proper operation. Such power may be provided externally from a separate source, or, the relay may be self-powered, meaning the power for the electronic devices is derived from an internal source, such as the relay's current transformers which are monitoring the current in each phase. The solid-state relay may also be configured to include reporting capabilities. For example, such a relay may communicate diagnostic information, such as an average current in the power conductors or a percentage current imbalance between the conductors.

Both big-metal/eutectic relays and solid-state relays are available in a single-phase configuration and a three-phase configuration. A typical overload relay configuration for a three-phase application is illustrated in FIG. 1, and a typical overload relay configuration for a single-phase application is illustrated in FIG. 2.

FIG. 1 illustrates the conventional use of an overload relay 16 in a three-phase application. In FIG. 1, three-phase power conductors 10a, 10b and 10c are connected to a motor 11 through short-circuit protection devices 12a, 12b, and 12c (e.g., circuit breakers, fuses, etc.), a contactor 14 (including contact pairs 14a/a', 14b/b', and 14c/c'), and an overload relay 16 (including relay paths 16a, 16b, and 16c), as shown. Relay "paths" 16a, 16b, and 16c may be the heater elements of a big-metal or eutectic relay which are in series with the power conductors and open to interrupt current flow through the power conductors upon occurrence of an overcurrent condition. Alternatively, paths 16a–c may simply be pass-through conductors through which the phase currents flow through relay 16 and on which phase currents are monitored. In such a device, relay 16 interrupts current flow upon detection of a fault condition by generating a trip signal which, in turn, causes an interruption in current flow through the power conductors. For example, such a trip signal may be used to de-energize the coil in a contactor (such as the coil of contactor 14), which results in opening of contactor pairs (e.g., pairs 14a/a', 14b/b', and 14c/c') connected in series with the power conductors. The designations "a", "b", and "c" are used herein to identify elements associated with phase "a", phase "b", and phase "c" of the single-phase or multi-phase system.

In FIG. 2, overload relay 16 is configured for use in a single-phase application in which current is conducted through power conductors 10a and 10b (i.e., phase "a" current and phase "b" current). As shown, the components have been wired such that motor 11 is connected only to overload relay paths 16a and 16c. The phase "c" load current provided to motor 11 is routed through overload relay path 16b and contactor pair 14b/b', and then through overload relay path 16c, contactor pair 14c/c', and short circuit protection device 12b (i.e., the phase "b" components are connected in series with the phase "c" components).

Proper operation of the overload relay 16 requires that the phase "b" current must be routed through both the phase "b" components and the phase "c" components, even though such a configuration results in extra wiring costs (as well as other drawbacks which will be explained below). For example, if overload relay 16 is a big-metal or eutectic overload relay, load current must be routed through all three heater elements to ensure accurate overload trip protection. Otherwise, special calibration or adjustments must be performed such that the big-metal or eutectic relay will operate properly. If relay 16 is a self-powered solid-state overload relay, current may need to flow through the current transformer in all three phases such that the current transformers can provide sufficient energy to power the relay's electronics. Further, if a self-powered or externally-powered overload relay is to provide phase loss protection, current must be routed through all three conductors to prevent an improper phase loss indication. That is, an apparent current imbalance would be indicated if phase loss protection is enabled and current is not routed through one of the three phases. Still further, a solid-state overload relay with a reporting feature will inaccurately calculate and report average current and current imbalance if current is not routed through each of the phase "a", phase "b", and phase "c" conductors as shown in FIG. 2.

Although the configuration illustrated in FIG. 2 resolves many of the problems that arise when using an overload relay in a single-phase application, problems still remain. In particular, a solid-state overload relay used in a single-phase system configured in accordance with FIG. 2 cannot provide ground fault protection. Three-phase solid-state relays typically detect the occurrence of a ground fault in a three-phase system by monitoring or determining the vector sum of the currents in each phase. Normal operation is indicated when the phase currents substantially cancel, and a ground fault is indicated if the vector sum of the phase currents exceeds a predetermined threshold value. If, however, such an overload relay is used in a single-phase application and configured as shown in FIG. 2, the vector sum of the phase currents would be equivalent to the magnitude of the single-phase current (i.e., the vector currents through phase "a" and phase "b" would cancel such that the resulting vector sum would be the current through phase "c"), resulting in inaccurate determination of the vector sum and improper indication of a ground fault condition.

To avoid the loss of ground fault protection when using a solid-state overload relay in a single-phase application, the system can be configured as shown in FIG. 3. In FIG. 3, the load current for conductor 12a (i.e., phase "a") is routed to the motor through the phase "a" components (i.e., short circuit protection device 12a, contactor pair 14a/a', and relay path 16a). Similarly, the load current for conductor 10b (i.e., phase "b") is routed to the motor through the phase "b" components (i.e., short circuit protection device 12b, contactor pair 14b/b', and relay path 16b). Conductor 10c and the phase "c" components (i.e., relay path 16c, contactor pair 14c/c', and short circuit protection device 12c) simply are not connected in the single-phase application. Although the configuration illustrated in FIG. 3 resolves the ground fault protection problem, it reintroduces the problems associated with accurate detection of overcurrents when using bi-metal/eutectic overload relays, insufficient supply of energy when using self-powered overload relays, and inaccurate reporting of current-related parameters and detection of underload and current imbalance conditions when using solid-state overload relays.

Accordingly, although an overload relay may be configured for both single-phase and three-phase applications, such interchangeable use has its drawbacks. Most particularly, an overload relay configured for a single-phase application can provide phase loss protection and accurate reporting of average current and current imbalance if configured in accordance with FIG. 2, but at the expense of ground fault protection. On the other hand, ground fault protection is provided if the relay is configured in accordance with FIG. 3, but underload and current imbalance protection and reporting capabilities are compromised.

It would be desirable, therefore, to provide a versatile, configurable overload relay that could be used in both single-phase and multi-phase applications. Such a relay would provide protection from overcurrent, undercurrent, current imbalance, phase loss, and ground faults in both the single-phase mode and the multi-phase mode of operation. Further, if the overload relay includes reporting capabilities, the relay would accurately report diagnostic information, such as average current and current imbalance, regardless of the mode of operation. Further still, to reduce wiring costs associated with using the overload relay in a single-phase application, the relay would preferably be configured as illustrated in FIG. 3, in which one of the three conductors and the associated phase components simply are not connected.

SUMMARY OF THE INVENTION

The present invention provides a relay which offers the aforementioned capabilities. The relay is configurable such that it operates in either a single-phase mode or a multi-phase mode.

Thus, in accordance with one aspect of the invention, a configurable relay for interrupting power provided by a plurality of power conductors includes an input configured to receive a selection parameter to select a single-phase or a multi-phase mode of operation, a sensor circuit to monitor the current flow through the power conductors, a control circuit, and an output. The control circuit, which is in communication with the input and the sensor circuit, is configured to determine a diagnostic parameter associated with the current flow based on the mode that is selected and the output indication from the sensor circuit. The output, which is in communication with the control circuit, provides an output signal based on the diagnostic parameter. The diagnostic parameter may be, for example, average current. The output signal, for example, may include a reporting signal representative of the magnitude of the average current or may include a trip signal to interrupt the current flow through the power conductors based on the diagnostic parameter.

In accordance with another aspect of the invention, a configurable relay for interrupting current flow through a plurality of power conductors configured for a single-phase application or a multi-phase application includes an input configured to receive a selection parameter to select the mode of operation, a plurality of sensors configured to monitor current flow in the power conductors, a control circuit in communication with the input and the sensors, and an output in communication with the control circuit. The sensors provide sensor output signals representative of the current in the power conductors and the vector sum of currents in the power conductors. The control circuit is configured to determine the occurrence of a ground fault condition and a phase loss condition based on the selected mode and the sensor output signals. The output provides an output signal upon occurrence of the ground fault condition and upon occurrence of the phase loss condition.

In accordance with yet another aspect of the invention, a configurable relay for monitoring parameters associated with power provided by a plurality of power conductors includes an input configured to receive a selection signal representative of a selection of one of a single-phase or multi-phase mode of operation, a plurality of sensors to monitor current in the power conductors, a control circuit in communication with the input and the sensors, and an output in communication with the control circuit. The control circuit is configured to determine a parameter associated with the current in the power conductors. If the single-phase mode of operation has been selected, then the control circuit determines the parameter based on sensor output signals representative of the current in two of the power conductors. If the multi-phase mode of operation has been selected, then the control circuit determines the parameter based on sensor output signals representative of the current in at least three of the power conductors. The output provides an output signal that is representative of the determined parameter.

BRIEF DESCRIPTION OF THE DRAWINGS

The foregoing and other advantages of the invention will become apparent upon reading the following detailed description and upon reference to the drawings in which in which like reference numerals denote like elements, and.

DETAILED DESCRIPTION OF SPECIFIC EMBODIMENTS

Figure 4:
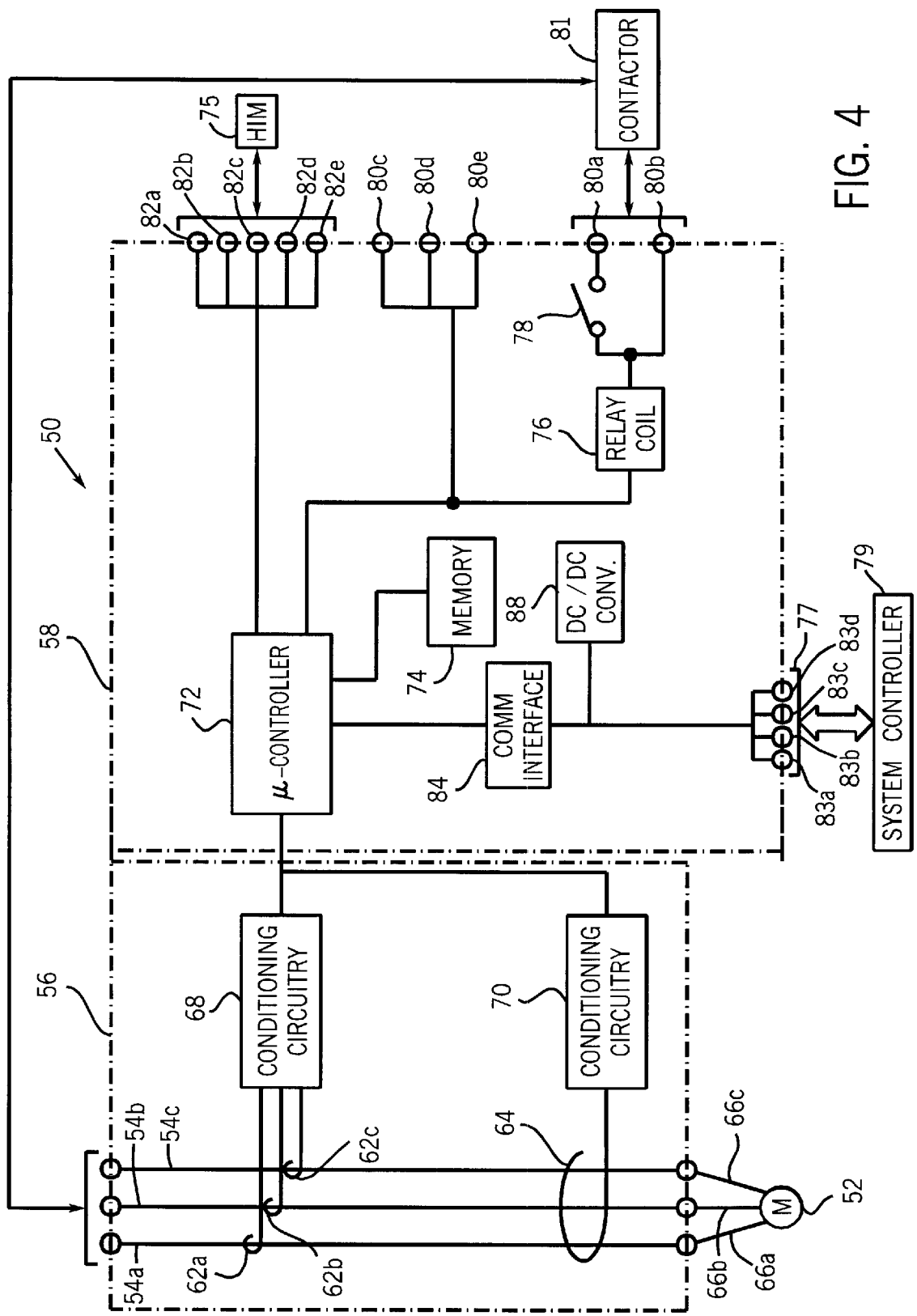
FIG. 4 is a diagrammatical illustration of a configurable overload relay in accordance with the invention.

Turning now to the drawings, and referring first to FIG. 4, a configurable overload relay 50 for monitoring and interrupting current flow provided to a motor 52 by power conductors 54a, 54b, and 54c is illustrated. Relay 50 includes a sensing module 56 and a control module 58. Sensing module 56 includes sensors 62a, 62b, 62c, and 64, which are arranged to monitor the current flow through power conductors 54a, 54b, and 54c. Sensors 62a–c and 64 may be Hall effect sensors or current transformers having a core through which power conductors 54a–c are passed. Sensors 62a, 62b, and 62c are configured to monitor the current flow in power conductors 54a, 54b, and 54c, respectively, and provide output signals representative of the individual phase currents. Sensor 64 is configured to simultaneously monitor the current flow in all three power conductors and provide an output signal representative of a vector sum of the phase currents. The output signals from sensors 62a–c and 64 are provided to conditioning circuitry 68 and 70, which are configured to appropriately condition (e.g., filter, amplify, convert, etc.) the sensor output signals for compatibility with the control circuitry in control module 58. In alternative embodiments of the invention, sensors 62a–c and 64 can be any type of sensor or sensing circuit for measuring or comparing current in power conductors. Further, sensor 64 may be omitted, and the vector sum of the individual phase currents instead may be derived from the signals provided by current sensors 62a–c.

Control module 58 includes a microprocessor or microcontroller 72 which is configured to execute a variety of processing and control functions in accordance with a program stored in a micro-controller memory 74 and based on input data received via any of external inputs 82a–e, network inputs 83a–d, and sensing module 56. Inputs 82a–e preferably are terminals or input ports (wired or wireless), which may be configured to receive data and parameters input from a compatible external source, such as a human interface module (HMI) 75, etc. Inputs 83a–d preferably are terminals or pins of a modular network connector 77, which connects overload relay 50 to a network, as will be discussed below, and to other interface circuits, networked data sources, or controllers.

Figure 5:
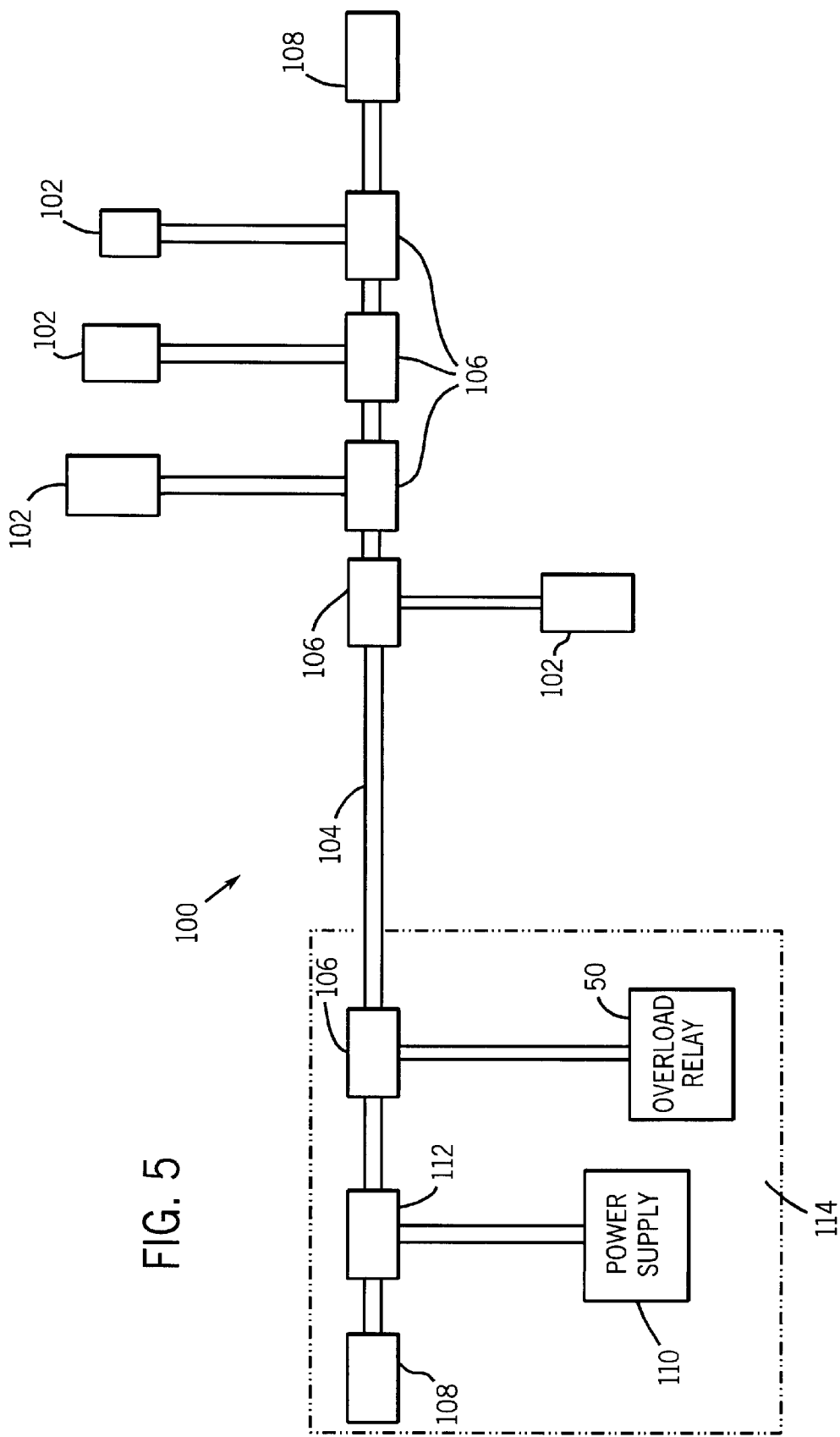
FIG. 5 is a diagrammatical illustration of a network to which the configurable overload relay of FIG. 4 may be connected.

For example, with reference to FIG. 5, overload relay 50 is particularly suited for use in a networked industrial control system. As illustrated, the networked system is a data and power network, designated generally by the reference numeral 100, in which a plurality of device nodes 102 are interconnected by a network cable 104. Each device node 102 receives power and data signals from cable 104 via a tap connector 106. Terminators 108 are provided at the ends of cable 104 for capping and electrically terminating the power and data conductors of the cable.

Each device node 102 typically may include a networked sensor or actuator unit, as can be appreciated by those skilled in the art. Depending upon the particular application (e.g., an industrial control system) in which network 100 is installed, nodes 102 may include such devices as push-button switches, proximity sensors, flow sensors, speed sensors, actuating solenoids, overload relays, etc. The nodes 102 can be coupled to network cable 104 in a variety of topologies, including branch drop structures, zero drop connections, short drop connections, and daisy chain arrangements.

As can be appreciated by those skilled in the art, each node 102 can transmit and receive data signals via the data conductors of cable 104 in accordance with various standard protocols. For example, the data conductors can conduct pulsed data signals in which levels of electrical pulses are identified by the nodes as data representative of node addresses and parameter information. Each node device generally is programmed to recognize data signals transmitted over cable 104 that are required for executing a particular node function. Hardware and software of generally known types are provided at sensing nodes for encoding sensed parameters and for transmitting digitized data signals over cable 104 representative of a node address and of a value of the sensed parameters.

Cable 104 also includes power conductors for providing electrical power to nodes 102. For example, the power conductors may form a direct current bus of predetermined voltage, such as 24 VDC. Electrical power is applied to the power conductors by power supply circuits, such as a power supply 110, electrically connected to the power conductors of cable 104 via power taps, such as a power tap 112. The configuration and circuitry for such power supply circuits are generally known in the art. Each power tap 112 may include protective devices, such as fuses, that may be removed from the power taps to isolate a portion of the network if desired.

As illustrated in FIG. 5, a device node (i.e., an overload relay 50) may be positioned within an enclosure 114 along with power supply 110, power tap 112, and terminator 108. Overload relay 50 is coupled to the network cable 104 via tap connector 106. In a typical industrial application, enclosure 114 may be installed in a location in a factory readily accessible to operations and maintenance personnel, while other components of the network may be positioned in manufacturing, processing, material handling and other locations remote from the enclosure. A "remote" location may be a location in the same building as the enclosure or may be geographically remote, such as another building, city, state, or country.

Figure 1:
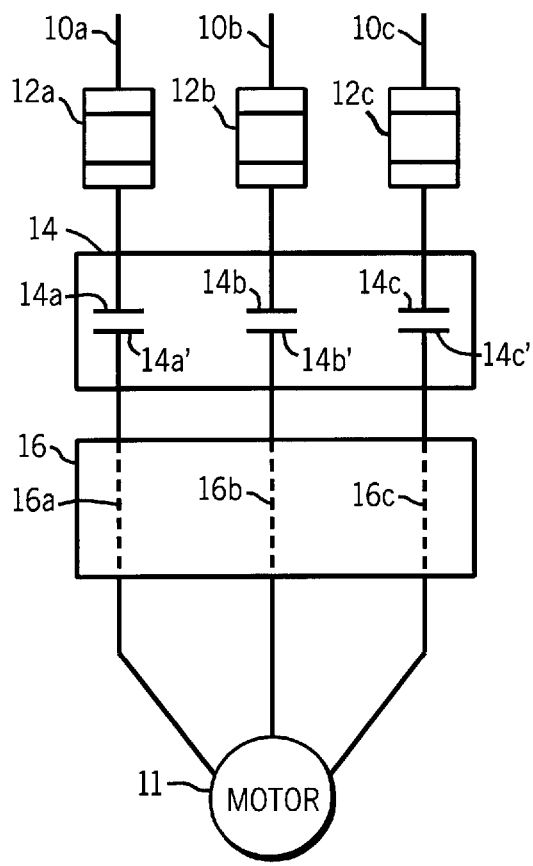
FIG. 1 is a diagrammatical illustration of an overload relay configured for a conventional three-phase application.
Figure 2:
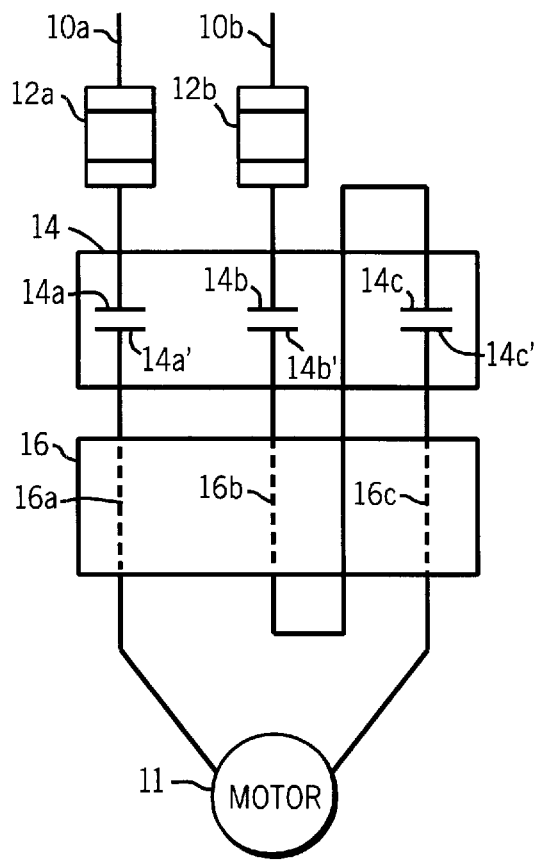
FIG. 2 is a diagrammatical illustration of the overload relay of FIG. 1 configured in a first manner for use in a single-phase application.
Figure 3:
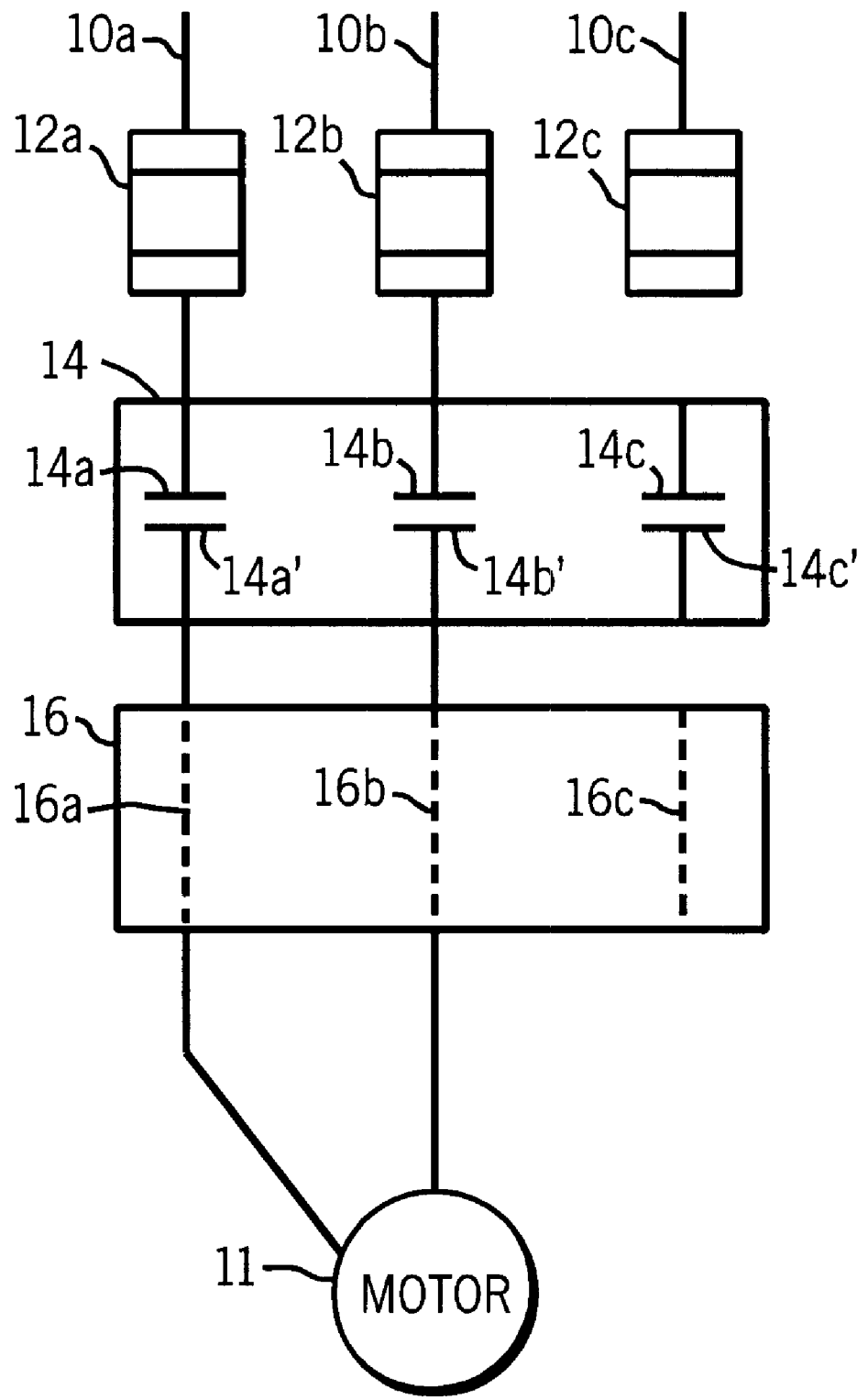
FIG. 3 is a diagrammatical illustration of the overload relay of FIG. 1 configured in a second manner for use in a single-phase application.

Retuning to FIGS. 1, 3 and 4, a user of a system in which relay 50 is installed can configure relay 50 for either a single-phase application or a multi-phase application by appropriately wiring relay 50 in accordance with FIG. 3 (single-phase) or FIG. 1 (three-phase) and inputting mode configuration information. In an exemplary embodiment, the mode of operation (i.e., single-phase or multi-phase) may be selected via a selection parameter received from a remote system controller 79 (or other interface circuit) coupled to the network or from an external, non-networked device, such as HIM 75. Based on the selected mode and on the sensor output signals received from sensing module 56, micro-controller 72 executes processing and control routines in accordance with a program stored in micro-controller memory 74 to determine diagnostic parameters associated with the monitored current. Such diagnostic parameters may include, for example, average current, current imbalance, ground fault current, occurrence of a fault condition, etc. Micro-controller 72 is further configured to generate an output signal or output data based on the determined parameters. For example, micro-controller 72 may provide a status signal indicative of the occurrence of a fault condition, a trip signal to interrupt current flow through the power conductors, or a reporting signal representative of the value of such parameters as average current, phase current, current imbalance, ground fault current, etc. The output signal or data may be provided at output terminals 80a–e to external stand-alone devices (e.g., a contactor 81) and/or at network terminals 83a–d to other networked devices.

In the embodiment illustrated, micro-controller 72 is configured to energize a relay coil 76 of a sub-miniature relay upon detection of a fault condition associated with the current flow through the power conductors (e.g., ground fault, phase loss, overcurrent, etc.). Energization of coil 76 opens a relay switch 78, thus providing a trip signal at outputs 80*a* and 80*b* to cause interruption of current flow through the power conductors 54*a–c*. For example, outputs 80*a* and 80*b* may be appropriately connected such that relay switch 78 is in series with an external power supply and the coil (not shown) of three-phase contactor 81. When relay switch 78 opens in response to indication of a fault condition, the coil of contactor 81 is de-energized and the contactor pairs of the contactor open, interrupting current flow through the power conductors 54*a–c*. Micro-controller 72 also may be configured to energize or de-energize coil 76 in response to signals received from networked sources via terminals 83 or from non-networked sources via input terminals 82. In alternative embodiments, the fault logic may be inverted, such that micro-controller 72 generates a signal which de-energizes relay coil 76 upon detection of a fault condition. In such an embodiment, de-energization of coil 76 results in the trip signal at outputs 80*a* and 80*b* that causes interruption of current flow through the power conductors 54*a–c*.

As mentioned above, overload relay 50 can be configured to exchange data with other networked devices or controllers via inputs 83*a–d*. Data exchange between relay 50 and other networked devices passes through a communication interface 84 of control module 58. Communication interface 84 formats the data in an appropriate manner for exchange between micro-controller 72 and other networked devices.

In the embodiment illustrated in FIG. 4, relay 50 receives power from an external networked source (e.g., power supply 110) to provide energy for its electronic devices. The power, which is received via terminals 83, is appropriately conditioned by a DC/DC converter 88. For example, DC/DC converter 88 may convert 24 VDC received from the network to 5VDC, which is a level that is compatible with the relay's internal electronic components.

Figure 6:
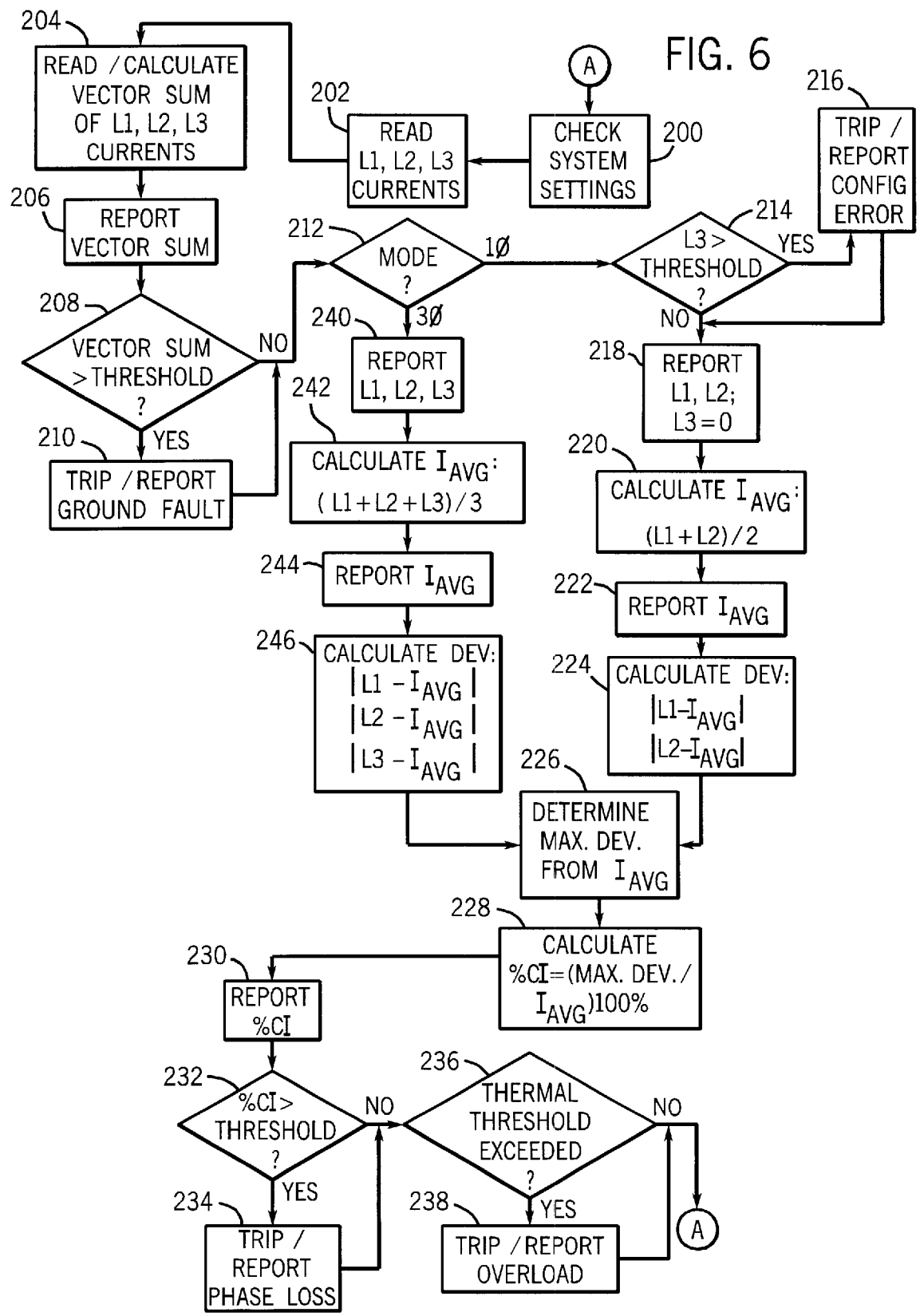
FIG. 6 is a flow chart illustrating the operation and features of the configurable overload relay of FIG. 4 in the single-phase mode of operation and the multi-phase mode of operation.

Turning now to FIG. 6, a flow chart of an exemplary routine executed by configurable overload relay 50 for appropriately determining parameters associated with current flow and providing output indications based on the determined parameters is illustrated. After relay 50 has been appropriately wired into either a three-phase configuration (see FIG. 1) or a single-phase application (see FIG. 3) and the mode of operation (i.e., single-phase or three-phase) has been selected, the system settings are checked, including the selected mode of operation (step 200). Relay 50 then reads currents L1, L2, and L3 on the power conductors 54*a*, 54*b*, and 54*c* (step 202) and determines the vector sum of the currents on the power conductors (step 204). In alternative embodiments of the invention, the vector sum may be calculated by other circuitry, such as micro-controller 72, based on the individually monitored phase currents. Relay 50 then reports the value of the vector sum of the currents by providing an output signal to the network via terminals 83 or, alternatively, at its external outputs 80 (step 206). Relay 50 further determines whether the vector sum has exceeded a predetermined threshold that is indicative of the occurrence of a ground fault condition (step 208). If the threshold has been exceeded, relay 50 provides an output signal that may include a trip signal to interrupt current flow through the power conductors, a status signal representative of the occurrence of the fault, etc. (step 210). If the vector sum does not exceed the threshold, then relay 50 determines other current-related parameters based on whether the three-phase or single-phase mode of operation has been selected (step 212). Further, even if a ground fault condition is indicated, relay 50 continues to examine the other current-related parameters in the event that other types of fault conditions also may have occurred.

As illustrated in FIG. 6, if the single-phase mode has been selected, then there should be no current flow through the phase "c" components since phase "c" should not be connected. Accordingly, if relay 50 has measured L3 (i.e., phase "c") current that exceeds a minimal threshold (step 214), then relay 50 has been improperly configured (e.g., mis-wired, improper selection of mode) for the single-phase mode of operation. In such a case, relay 50 will provide an output signal that may include a warning signal indicating a configuration error (step 216). Based on the warning signal, the operator may elect to either shut down the system to correct the configuration error or to continue operation of the system in the mis-configured mode.

Regardless of whether the overload relay has been properly or improperly configured, the magnitudes of the phase "a" and phase "b" currents (i.e., L1 and L2) are reported (step 218). It should be understood, however, that if improperly configured, the current-related parameters may be improperly determined and reported. If properly configured, the phase "c" current (L3) is reported as having a magnitude of 0 amperes (step 218). Micro-controller 72 of relay 50 then determines the average current through the power conductors (step 220) using the algorithm:

$$I_{AVG}=(L1+L2)/2$$

The value of the average current is then reported via an appropriate output signal (step 222).

The micro-controller 72 then determines current imbalance by first calculating the deviation of each phase current from the calculated average current (step 224):

$$L1\ Dev.=|L1-I_{AVG}|$$

$$L2\ Dev.=|L2-I_{AVG}|$$

Then the maximum deviation (i.e., "Max. Dev.") of each of the calculated deviations is determined (step 226) and this maximum deviation is used to calculate the percentage current imbalance in the power conductors (step 228):

$$\%CI=(Max.\ Dev/I_{AVG})*(100\%)$$

The value of the current imbalance may then be reported via an appropriate output signal (step 230).

Relay 50 then determines whether the current imbalance has exceeded a predetermined threshold value that is indicative of the occurrence of a phase loss condition (step 232). If the threshold has been exceeded, then an output is generated that may include a trip signal to interrupt current flow and a reporting signal indicating the occurrence of a phase loss (step 234).

Once the comparison of the current imbalance to the threshold value has been performed, and regardless of whether the current imbalance has exceeded the threshold, relay 50 then determines utilization of the thermal capacity of the load, which may be indicative of the occurrence of an overload or overcurrent condition (step 236). For example, the utilization of the load's thermal capacity may be determined by comparing the actual load current to the full current rating of the load as a function of time. Based on this comparison, relay 50 may determine that a thermal threshold of the load has been exceeded. If an excessive thermal load is indicated, then an output is generated that may include a trip signal and a reporting signal indicating the occurrence and magnitude of the overload (step 238). The processing routine then returns to step 200.

Returning to step 212, if the three-phase mode of operation has been selected, then the value of phase currents, L1, L2, and L3, may be reported via appropriate output signals (step 240). Micro-controller 72 then calculates an average current (step 242) using the following algorithm:

$$I_{AVG}=(L1+L2+L3)/3$$

The value of the average current may then be reported via an appropriate output signal (step 244).

Micro-controller 72 then determines a current imbalance between the power conductors by first calculating the deviation of each phase current from the determined average current (step 246):

$$L1\ \text{Dev.}=|L1-I_{AVG}|$$
$$L2\ \text{Dev.}=|L2-I_{AVG}|$$
$$L3\ \text{Dev.}=|L3-I_{AVG}|$$

The maximum deviation from the average current is then determined (step 226) and the percentage current imbalance is calculated in the same manner as discussed above with respect to the single-phase mode of operation (step 228). The processing routine then continues through each of steps 230, 232, 234, 236, and 238 as discussed above.

It should be understood that the specific sequence of steps in the processing routine described above should not be construed as limiting to the invention. For instance, the overload condition determined at step 236, the ground fault condition determined at step 208, and the phase loss condition determined at step 232 may be determined at any point in the routine after the phase currents are read and the appropriate calculations and comparisons are performed. Further, the fault conditions may be determined in parallel or in any sequence other than the sequence illustrated in FIG. 6. Still further, more or fewer parameters may be determined or reported and different types of output signals may be generated as would be appropriate for the particular application in which the configurable overload relay is being used.

It should further be understood that the specific embodiments shown and described herein are by way of example only, and the invention may be susceptible to various modifications and alternative forms. Accordingly, the invention is not intended to be, and should not be construed as, limited to the particular forms disclosed. Rather, the invention is to cover all modifications, equivalents, and alternatives falling within the spirit and scope of the invention as defined by the following appended claims.

What is claimed is:

1. A configurable relay for interrupting power provided by a plurality of power conductors, the configurable relay comprising:
    an input configured to receive a selection parameter representative of a selection of one of a single-phase mode of operation and a multi-phase mode of operation;
    a sensor circuit configured to monitor current flow through the power conductors and to provide a sensor output indication representative of the current flow;
    a control circuit in communication with the input and the sensor circuit and configured to determine a diagnostic parameter associated with the current flow, based on the selection parameter and the sensor output indication; and
    an output in communication with the control circuit to provide an output signal based on the diagnostic parameter.

2. The configurable relay as recited in claim 1, wherein the output signal is a trip signal to interrupt the current flow through the power conductors when the diagnostic parameter is indicative of a power conductor fault condition.

3. The configurable relay as recited in claim 2, wherein the power conductor fault condition is one of a ground fault condition, a phase loss condition, and an overload condition.

4. The configurable relay as recited in claim 1, wherein the sensor output indication is representative of a current in each of the power conductors.

5. The configurable relay as recited in claim 4, wherein the sensor output indication is further representative of a vector sum of the currents in the power conductors.

6. The configurable relay as recited in claim 4, wherein, when the single-phase mode of operation is selected, the control circuit determines the diagnostic parameter based on the current in two power conductors, and, when the multi-phase mode of operation is selected, the control circuit determines the diagnostic parameter based on the current in three power conductors.

7. The configurable relay as recited in claim 6, wherein the diagnostic parameter is an average current in the power conductors.

8. The configurable relay as recited in claim 6, wherein the diagnostic parameter is a current imbalance in the power conductors.

9. The configurable relay as recited in claim 6, wherein the diagnostic parameter is a ground fault current.

10. The configurable relay as recited in claim 1, wherein the input is in communication with a network, and the selection parameter is received via the network.

11. The configurable relay as recited in claim 10, wherein the selection parameter is provided from a location remote from the configurable relay.

12. The configurable relay as recited in claim 1, wherein the control circuit includes a memory and a micro-controller, and the micro-controller determines the diagnostic parameter in accordance with a program stored in the memory.

13. A configurable relay for interrupting current flow through a plurality of power conductors configured in a single-phase mode or a multi-phase mode, the configurable relay comprising:
    an input configured to receive a selection parameter to select one of a single-phase mode of operation and a multi-phase mode of operation;
    a plurality of sensors configured to monitor current flow in the power conductors and to provide sensor output signals representative of current in the power conductors and a vector sum of currents in the power conductors;
    a control circuit in communication with the input and the plurality of sensors and configured to determine, based on the selected mode and the sensor output signals, occurrence of a ground fault condition and occurrence of a phase loss condition; and
    an output in communication with the control circuit to provide an output signal upon the occurrence of the ground fault condition and upon the occurrence of the phase loss condition.

14. The configurable relay as recited in claim 13, wherein the current through the power conductors is interrupted in response to the output signal.

15. The configurable relay as recited in claim 13, wherein the output signal indicates the occurrence of the ground fault condition and/or the phase loss condition.

16. The configurable relay as recited in claim 13, wherein the control circuit is configured to determine an average current in the power conductors based on the selected mode and the sensor output signals.

17. The configurable relay as recited in claim 16, wherein the output signal includes a reporting signal representative of the value of the average current.

18. The configurable relay as recited in claim 16, wherein, in the single-phase mode of operation, the control circuit determines the average current based on the sensor output signals representative of the current in each of two power conductors, and, in the multi-phase mode of operation, the control circuit determines the average current based on the sensor output signals representative of the current in each of at least three power conductors.

19. A configurable relay for monitoring parameters associated with power provided by a plurality of power conductors, the configurable relay comprising:

an input configured to receive a selection signal representative of a selection of one of a single-phase mode of operation and a multi-phase mode of operation;

a plurality of sensors configured to monitor current in the power conductors and provide sensor output signals representative of the monitored current;

a control circuit in communication with the input and the plurality of sensors and configured to determine a parameter associated with the current in the power conductors, wherein, if the single-phase mode of operation is selected, the control circuit determines the parameter based on the sensor output signals representative of the current in two of the power conductors, and, if the multi-phase mode of operation is selected, the control circuit determines the parameter based on the sensor output signals representative of the current in at least three of the power conductors; and an output in communication with the control circuit to provide an output signal based on the parameter.

20. The configurable relay as recited in claim 19, wherein the parameter is an average current.

21. The configurable relay as recited in claim 19, wherein the parameter is a ground fault current.

22. The configurable relay as recited in claim 19, wherein the parameter is a current imbalance.

23. The configurable relay as recited in claim 20, wherein the output signal includes a reporting signal representative of a magnitude of the average current.

24. The configurable relay as recited in claim 22, wherein the control circuit is further configured to determine occurrence of a phase loss condition based on the current imbalance and the selection of the mode of operation.

25. The configurable relay as recited in claim 24, wherein the output signal includes a trip signal to interrupt the current in the power conductors upon the occurrence of the phase loss condition.

26. The configurable relay as recited in claim 24, wherein the sensor output signals include a vector sum of the currents in the power conductors, and the control circuit is further configured to determine occurrence of a ground fault condition based on the vector sum.

27. The configurable relay as recited in claim 19, wherein the input is in communication with a network.

28. The configurable relay as recited in claim 27, wherein the selection signal is provided from a location remote from the configurable relay.

* * * * *